F. F. HAUSTGEN.
CHANGE SPEED GEAR.
APPLICATION FILED AUG. 29, 1919.

1,413,114.

Patented Apr. 18, 1922.
2 SHEETS—SHEET 1.

Inventor.
Fernand F. Haustgen,
By B. Singer, Atty.

though 9 is provided with a spindle 10 pivoted in a projection which forms a nut mounted on a screw 12 so that it cannot rotate. The end of the lever 8, opposite to the rod 7, carries a shaft 13 on which are pivoted two rods 14 and 15, the upper ends of

UNITED STATES PATENT OFFICE.

FERNAND FRANCOIS HAUSTGEN, OF PARIS, FRANCE.

CHANGE-SPEED GEAR.

1,413,114. Specification of Letters Patent. Patented Apr. 18, 1922.

Application filed August 29, 1919. Serial No. 320,728.

*To all whom it may concern:*

Be it known that I, FERNAND FRANCOIS HAUSTGEN, a citizen of the Republic of France, residing at Paris, France, have invented new and useful Improvements in Change-Speed Gears, (for which I have filed in France applications No. 86,379, Oct. 7, 1916, and addition No. 9861, Mar. 27, 1917, and in Italy No. 164,600—76-479—Feb. 14, 1918,) of which the following is a specification.

The object of this invention is mechanism for varying the speed of rotation of a shaft in either direction from zero to a given maximum and which will pass through all the variations of speed without any shock. The mechanism can be applied to a shaft rotating in one direction at a constant speed and drive therefrom a second shaft at different speeds in the opposite direction and the speed of the latter can be varied in one direction or the other by rotation between two predetermined limits, so as to give any speed desired between the two fixed limits. In order that the invention may be understood a drawing is annexed to the specification merely to illustrate it.

Figure 1:
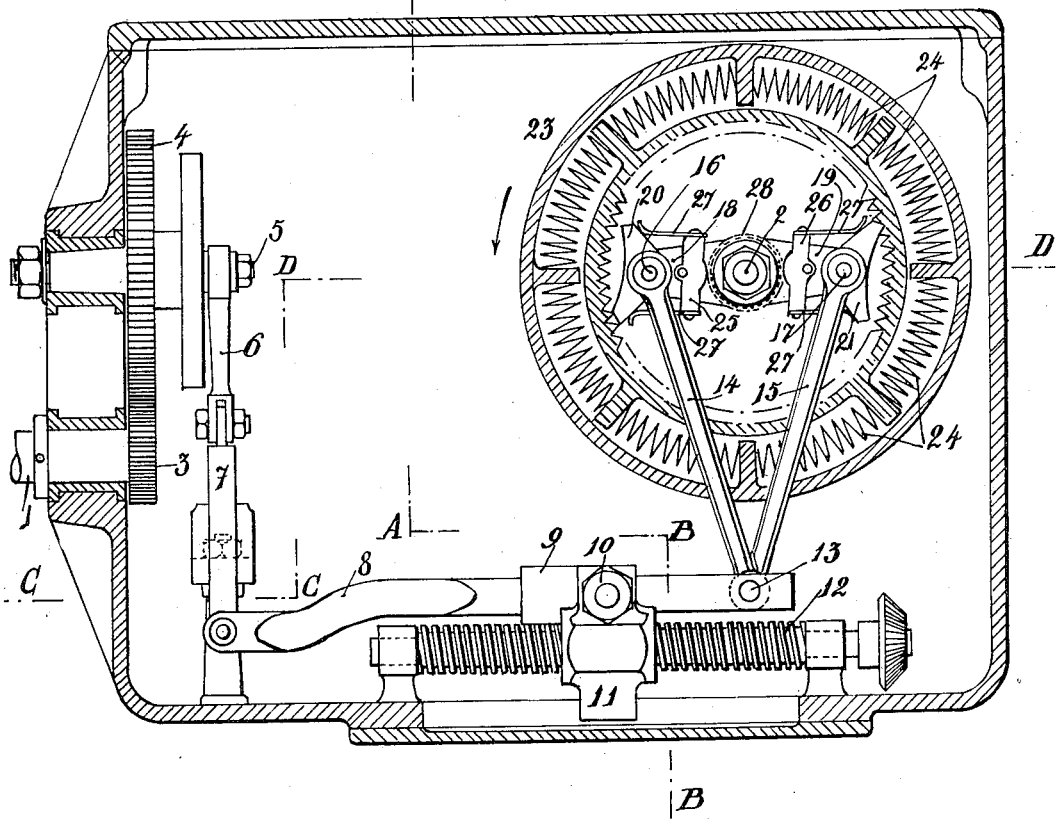
Fig. 1 is a longitudinal sectional elevation of the mechanism.
Figure 3:
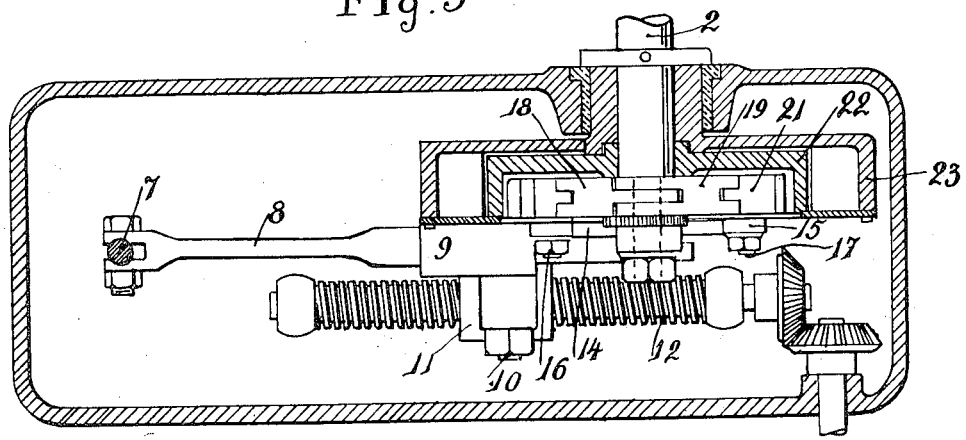
Fig. 3 is a horizontal section on lines C—C D—D of Fig. 1.
Figure 2:
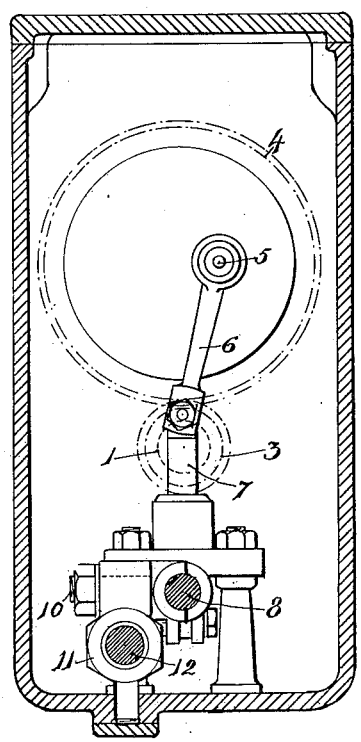
Fig. 2 is a transverse longitudinal section on lines A—A B—B of Fig. 1.

In the drawing, 1 is engine shaft always rotating in the same direction and at a constant speed, whilst 2 is the driven shaft which is to be capable of being rotated in either direction at any speed between zero and a fixed maximum.

The pinion 3 is keyed on the shaft 1 and gears with the wheel 4 carrying an eccentric stud 5 and connected by the connecting rod 6 to a rod 7. The rod 7 is suitably guided so that it can be pivoted about one of the ends of a lever 8.

The lever 8 is mounted in a guide 9 in which it can slide with very little friction. The guide 9 is provided with a spindle 10 pivoted in a projection which forms a nut mounted on a screw 12 so that it cannot rotate. The end of the lever 8, opposite to the rod 7, carries a shaft 13 on which are pivoted two rods 14 and 15, the upper ends of which are pivoted on shafts 16 and 17 carried on levers 18 and 19 which are pivoted on the shaft 2.

On each of the shafts 16 and 17 respectively are mounted the double pawls or ratchets 20 and 21, one or other end of which can engage with an interior toothed wheel 22. The interior toothed wheel 22 is mounted on the shaft 2 on which is keyed a pulley 23 with which it can be connected without shock by the springs 24.

The levers 18 and 19 have the arms 25 and 26 pivotally mounted upon them, and each arm carries a pair of springs 27.

Each of the arms 25, 26, is provided with a toothed sector gearing with a wheel 28, the angular position of which can be varied in relation to the exterior by suitable means, so that one or other of the ends of each of the pawls 20 and 21 can be connected through the pressure of the springs 27 with the internal teeth of the wheel 22.

If the parts of the mechanism are in the position shown in the drawings at each oscillation of the lever 8 the pulley 23 and consequently the shaft 2 will be turned through a certain angle in the direction shown by the arrow 29.

If the position of the pawls 20 and 21 is reversed through the wheel 28, the pulley 23 will be rotated through the same angle but in the reverse direction.

The movement will be continued in the two cases because if, in one direction of movement of the lever 8 it is the pawl 20 of the rod 14 which operates the wheel 22, and in the opposite direction it is the pawl 21 of the rod 15 which operates the wheel 22, and by reason of the springs 24, the reciprocating movement of the lever 8 will be transformed into a rotary movement of the shaft 2.

If the screw 12 is rotated to cause the nut 11, and the stud 10 to approach the shaft 13 the amplitude of the angular displacement of the shaft 13 will be decreased, and the speed of rotation of the shaft 2 will be correspondingly diminished. The decrease will be progressive, and when the stud 10 is parallel with the shaft 13, the angular displacement of the latter will be nil, and the speed of rotation of the shaft 2 will consequently be zero.

If, on the other hand, the screw 12 is rotated so that the nut 11 moves away from the shaft 13, the amplitude of the movement of this shaft will be increased, and the speed of rotation of the shaft 2 will increase as the distance between the stud 10 and the shaft 13 increases.

In the example given, the movement of the shaft 1 is transmitted to the lever 8 through the wheel 4, which rotates at a less speed than the shaft. It is evident however, that the relation of the diameters of the wheels 3 and 4 can be reversed and that the wheels 3 and 4 can be suppressed and the eccentric stud 5 carried directly on the engine shaft 1.

In the mechanism which has already been described, the movement of the engine shaft 1, which has to be transmitted at a greater or less speed and either in the same direction or in the reverse direction to the driven shaft 2, acts on the lever 8 through the gear wheel 4 (which however may be omitted) of greater or less diameter than the wheel 3 according as to whether a greater or less speed of rotation of the latter is required.

In either case the movement of rotation of the shaft 1, with or without a varied speed, is transmitted by the said lever 8 through the eccentric stud 5, connecting rod 6 and sliding rod 7.

The invention is characterized by:—

An internally toothed ratchet wheel mounted for rotation, a lever mounted for oscillation, a rocking bar pivotally mounted at a point intermediate its ends, on said lever, a pawl pivotally mounted on said lever and having oppositely extending arms either of which may be engaged with the teeth of said ratchet wheel, and springs on the ends of said rocking bar and bearing each on one of said arms of the pawl, a second lever mounted for oscillation, means to operate said second lever, and a rod connecting said second lever and the first named lever.

In witness whereof I affix my signature.

FERNAND FRANCOIS HAUSTGEN.